June 27, 1950  F. L. McLAUGHLIN  2,513,037
CAPTIVE NUT
Filed Jan. 8, 1946

INVENTOR.
Frank L. McLaughlin
BY
Albert J. Taylor
Att'y

Patented June 27, 1950

2,513,037

UNITED STATES PATENT OFFICE 2,513,037

CAPTIVE NUT

Frank L. McLaughlin, Detroit, Mich.

Application January 8, 1946, Serial No. 639,824

1 Claim. (Cl. 85—32)

This invention relates to fastening devices, or nut type securing means, and has for its primary object to provide a nut and retaining means for holding the nut on one of a pair of members to be secured together so that when the pair of members are assembled together a screw or bolt for fastening them together may be easily inserted therein and tightened.

The present fastening device is particularly concerned with the assembly of automobile fenders and panels. To be suited for such use it is essential that the nut be captive, yet it must be capable of shifting its position to accommodate itself to misaligned holes. In other words, the nut must be capable of floating in all directions so that if the holes in the panel or fender do not coincide exactly with the holes in the member to be secured thereto the screw may still be inserted into the nut with little difficulty. The screws are ordinarily placed and tightened by power screw drivers, which means that the nut must be retained in such manner that it cannot be accidentally dislodged from its retaining means by careless use of the power screw driver. Use of a power screw driver also creates a problem in that the nut which must be capable of floating must also be incapable of cocking, which causes the screw to bind in such a manner that it can only be removed with difficulty. More specifically stated, the principal object of this invention is to provide a nut for use in conjunction with automobiles which is captive with respect to the panel or fender, which is capable of floating to compensate for mis-alignment, and which cannot cock or become dislodged as a result of careless use of a power screw driver.

Another object is to provide a nut and retaining means of the character above mentioned which may be snapped into place in the retaining means by a rotary motion of the nut. This function is particularly advantageous in the case of automobile panels and fenders in that it avoids the necessity of conveying the panels or fenders to clinching machines to clinch the nut retaining means as was heretofore the practice, and further in that the rotary motion for securing the nut enables it to be inserted into extremely close quarters.

Another object is to provide a nut and retaining means which is so compact that the panels or fenders may be stacked one on another after the nut has been assembled in place thereon.

Figure 1:
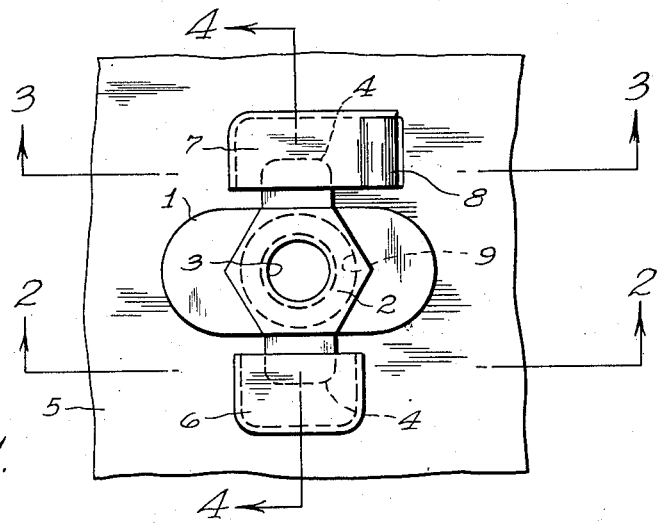
Figure 2:
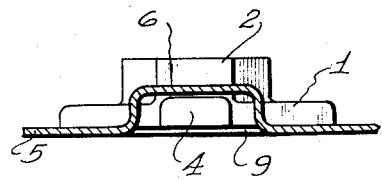
Figure 3:
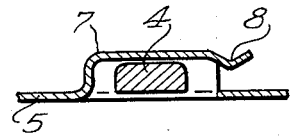
Figure 4:
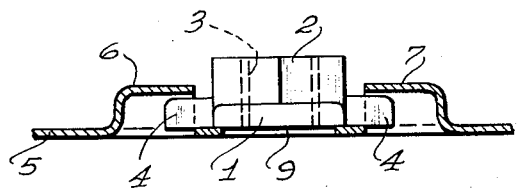

With the above and other ends in view the invention is more fully disclosed with reference to the accompanying drawing, in which Fig. 1 is a front elevation showing the nut assembled in the retaining means, and Figs. 2, 3, and 4 are sections taken respectively on the lines 2—2, 3—3 and 4—4 of Fig. 1.

More specifically, 1 designates a nut body having a mid-portion 2 of hexagonal shape with a screwthreaded hole 3 extending therethrough in the usual manner of a nut. The mid-portion 2 is made of hexagonal shape in order that it may be engaged by a wrench for purposes that will hereinafter appear. The particular shape is unimportant in that any other shape or form suited for engagement by a wrench could be substituted therefor. The nut body 1 is also formed with a pair of oppositely extending arms 4.

The nut retaining member comprises a sheet metal body 5 having a pair of louvers 6 and 7 struck upwardly therefrom. The louver 6, as may best be seen in Fig. 2, is closed at both ends, whereas the louver 7, as may best be seen in Fig. 3, is open at one end and closed at the other end, and the top wall of the louver 7 is slitted and bent at 8 to provide a retaining member.

In using the present nut and retaining means, one of the arms 4 is inserted in the louver 6 which then functions as a fulcrum means so that the other arm 4 may be snapped under the retaining member 8 and into the other louver 7 by a rotary motion of the nut. This rotary motion may easily be imparted to the nut by means of a socket type wrench engaging the mid-portion of the nut.

When the nut is inserted in the louver as above described the sides of the main body portion 1 engage the near or parallel edges of the louver to prevent the arms 4 from disengaging the louver, and also to prevent rotation of the nut when a screw is engaged with the threads thereof. The louver, arms and body portion are all so relatively proportioned that the nut is capable of floating in all directions so that a screw may be readily inserted therein by extending the screw through the aperture 9 in the sheet metal body 1.

Although a specific embodiment of the invention has been illustrated and described it will be understood that various changes may be made within the scope of the appended claim without departing from the spirit of the invention, and such changes are contemplated.

What I claim is:

A sheet metal body formed with a pair of louvers struck therefrom in opposed parallel relation, said louvers each comprising pocket-like formations disposed out of the normal plane of said sheet metal body in such manner that the arms of a nut resting on said sheet metal body may project into said pocket-like formations, one of said pocket-like formations being closed at both ends and the other being open at one end whereby a nut having a pair of opposed arms may be inserted into the pocket-like formations by first inserting one of the nut arms into the pocket-like formation having both sides closed and then rotating the nut to swing the other arm into the other pocket-like formation, the pocket-like formation having the open side also having its top portion slitted and bent below the normal plane of the top portion and comprising yieldable means for preventing removal of an inserted nut arm.

FRANK L. McLAUGHLIN.

REFERENCES CITED

The following references are of record in the file of this patent:

UNITED STATES PATENTS

| Number | Name | Date |
|---|---|---|
| 2,249,923 | Whitcombe | July 22, 1941 |
| 2,335,593 | Howe | Nov. 30, 1943 |
| 2,395,650 | Allen | Feb. 26, 1946 |